United States Patent [19]

Suld et al.

[11] 4,100,338

[45] Jul. 11, 1978

[54] PROCESS FOR PREPARING SOLID POLYMERS OF NORBORNADIENE

[75] Inventors: George Suld, Springfield; Abraham Schneider, Overbrook Hills; Harry K. Myers, Jr., Aston, all of Pa.

[73] Assignee: Sun Oil Company of Pennsylvania, Philadelphia, Pa.

[21] Appl. No.: 829,313

[22] Filed: Aug. 31, 1977

[51] Int. Cl.$^2$ .......................... C08F 4/70; C08F 32/06
[52] U.S. Cl. .................... 526/142; 526/144; 526/160; 526/161; 526/169.1; 526/281
[58] Field of Search ................ 526/161, 169.1, 281, 526/139, 160, 142, 144

[56] References Cited

U.S. PATENT DOCUMENTS

| | | | |
|---|---|---|---|
| 3,140,275 | 7/1964 | Spooncer | 526/281 |
| 3,192,191 | 6/1965 | Lito et al. | 526/281 |
| 3,459,825 | 8/1969 | Eberhardt et al. | 526/161 |

FOREIGN PATENT DOCUMENTS 863,373  3/1961  United Kingdom ................. 526/281

OTHER PUBLICATIONS

Kennedy et al., Polymer, vol. 6, (1965), pp. 133–139.
Roller et al., Journal of Applied Polymer Sciences, vol. 17, (1973), pp. 2223–2233.
Schrauzer et al., Tetrahedron Letters, No. 8, (1970), pp. 543–545.

*Primary Examiner*—Edward J. Smith
*Attorney, Agent, or Firm*—J. Edward Hess; Donald R. Johnson; Anthony Potts, Jr.

[57] ABSTRACT

Norbornadiene is catalytically polymerized to a solid white polymer in the presence of a catalytic system of nickel acetylacetonate or a nickel-phosphine complex and an alkyl aluminum chloride. The polymer can be used as a solid high energy fuel.

11 Claims, No Drawings

PROCESS FOR PREPARING SOLID POLYMERS OF NORBORNADIENE

BACKGROUND OF THE INVENTION

The invention herein described was made in the course of or under a contract with the United States Air Force Systems Command.

The invention relates to the catalytic homopolymerization of norbornadiene, hereinafter referred to as NBD. Particularly the invention relates to the preparation of a solid polymer using nickel acetylacetonate or a specified nickel-phosphine complex. The polymer can be used as a solid high energy fuel.

Norbornadiene is also known as bicyclo-(2.2.1) heptadiene-2,5. A method of preparation is disclosed in U.S. Pat. No. 2,875,256 issued Feb. 24, 1959. Hereinafter, norbornadiene is referred to as NBD. The latter can be represented by either one of the following structural formulas:

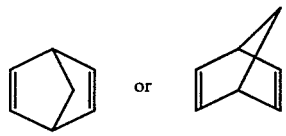

J. P. Kennedy et al in *Polymer* 6, 1965, in an article titled "Cationic Transannular Polymerization of Norbornadiene" discloses polymerization of NBD using an aluminum chloride catalyst in ethyl chloride and methylene chloride solvent at temperatures ranging from $-123°$ C to $+40°$ C. M. B. Roller et al in *Journal of Applied Polymer Science*, Vol. 17, 1973, "Thermomechanical Behavior of a Polynorbornadiene" reports similar results. The yield of NBD polymer reported by the aforementioned references were in the order of 10–20 weight percent.

SUMMARY OF THE INVENTION

Rapid polymerization of NBD is obtained using a catalytic amount of a homogeneous catalytic system consisting of nickel acetylacetonate or a nickel-phosphine complex selected from the group consisting of the following:
  nickel dihalide bis(tri-n-butylphosphine)
  nickel dihalide bis(tricyclohexylphosphine)
  nickel dihalide bis(triphenylphosphine)
  isopropyl triphenyl phosphonium nickel dihalide bromide triphenylphosphine
  nickel dicarbonyl bis(triphenylphosphine)
  nickel acetylacetonate hydrate and 1,2-bis(diphenylphosphino ethane)
and an alkyl aluminum chloride selected from the group consisting of diethyl aluminum chloride, ethyl aluminum dichloride and ethyl aluminum sesquichloride, hereinafter referred to as DEAC, EADC and EASC respectively. The halide can be a fluoride, chloride or a bromide. The conversion and yields as to the polymer are high and rapid.

DESCRIPTION

The catalytic polymerization of the NBD via present invention can be represented by the following formula reaction:

(A)

As shown NBD is contacted in the presence of a catalytic amount of the catalyst system which is defined herein. The resulting solid polymer has a high melting point for a hydrocarbon homopolymer.

The NBD used can contain a nominal amount of similar hydrocarbons, however, which if present should not be of a type which could adversely affect the reaction. If the NBD used contains undesirable hydrocarbons, the latter can be removed by known means.

The catalytic system favoring the aforementioned polymerization (A) contains components which are commercially available and methods for their preparation are known. One component is a nickel-phosphine complex selected from the group consisting of the following:

nickel dihalide bis(tri-n-butylphosphine) e.g. $NiCl_2(TBP)_2$
  nickel dihalide bis(tricyclohexylphosphine) e.g. $NiCl_2(TCHP)_2$
  nickel dihalide bis(triphenylphosphine) e.g. $NiCl_2(TPP)_2$
  isopropyl triphenyl phosphonium nickel dihalide bromide triphenylphosphine e.g. $[iPTPP]^+[NiCl_2BrTPP]^-$
  nickel dicarbonyl bis(triphenylphosphine) e.g. $Ni(CO)_2(TPP)_2$
  nickel acetylacetonate hydrate-1,2-bis(diphenylphosphino ethane) e.g. $NiA_2 2HOH$-DIPHOS.

Nickel acetylacetonate referred to hereinafter as $NiA_2$, by itself can be used in lieu of one of the aforementioned nickel-phosphine complexes. As used herein the former refers to both the anhydrous and hydrate forms. Another component of the catalytic system is DEAC, EADC or EASC. The amount of either component is a catalytic amount so that a suitable conversion to the NBD polymer occurs and the yield as to it is sufficient. Materials, which during the codimerization reaction could adversely affect the catalyst system, should not be present. For example, the presence of hydroxylic compounds such as water, alcohol or oxygen from air could deactivate the catalyst system. Thus the catalyst system can consist of the aforementioned components.

The amount of the nickel-phosphine complex or the $NiA_2$ should be catalytically sufficient to obtain the desired product. Generally the NBD to $NiA_2$ or nickel-phosphine complex mole ratio can range between from about 10 to about 2000 with a preferred range between from about 20 to about 1000.

DEAC, EADC or EASC is another component of the catalyst system. The amount of this component can vary substantially but generally it relates to the amount of $NiA_2$ or nickel-phosphine complex used. An effective DEAC, EADC or EASC to $NiA_2$ or nickel-phosphine complex mole ratio can be between from about 0.5 to about 100 with from about 1 to about 50 preferred and from about 3 to about 20 more preferred.

Generally, when DEAC, EADC or EASC is used it is advantageous to conduct the reaction under substantially anhydrous conditions and under an inert gas blanket. Excess DEAC, EADC or EASC also serves as a scavenger. The reaction time required for an economically satisfactory conversion and/or yield depends on a number of factors, such as catalyst to feed ratio, as well as operating conditions. Also the economics depend on capital investment and conversion per pass and the like. The catalyst to feed ratios are discussed hereinafter while typical conditions are provided by the Example.

A solvent can be used in the polymerization reaction. The solvent can be inert or it can be the NBD itself. Since the reaction is exothermic the solvent can serve as a heat sink. It can also assist in solubilizing the reaction components, that is the feed and the components of the catalyst, and thereby provide for a homogeneous reaction medium. Some solvent can be added to the system as a carrier for one or more of the catalyst components. For example, the DEAC is often maintained in an inert solvent such as toluene rather than NBD itself. Furthermore, the solvent should not adversely react with the feed, products or catalyst, therefore, if it is not NBD, it should be "inert". Also, presence of the solvent can facilitate the handling of the reaction mixture. Classes of suitable inert solvents include aromatic hydrocarbons, cycloparaffins, ethers, halogenated aromatics, halogenated paraffins and halogenated cycloparaffins. Specific examples include benzene, toluene, xylenes, cyclohexane, diethylether, chlorobenzene, bromobenzene, chlorinated cyclohexane and the like. As to the amount of solent used, excessive amounts decrease the reaction rate, and thus adversely affect the economics for a commercial operation. The solent can be removed from the polymer by known means.

The polymerization of NBD in the presence of the catalyst system can occur at ambient temperature. Thus the temperature of the homogeneous feed-catalyst system mixture need not be raised to initiate reaction A. Of course, if the mixture is at an extremely low temperature, then heating of the cooled mixture could be necessary. However, once reaction A is underway, heat is generated and the temperature of the mixture increases. If the temperature increases too much then some cooling would be required. Generally, however, the polymerization of the NBD with an optimal amount of the catalyst system is not characterized by a rapid exotherm.

Polymerization of the NBD most efficiently occurs in a liquid phase and therefore it is not desirable to have the reaction temperature largely exceed the boiling points of the NBD and/or any solvent. Conversely, if the temperature is too low the reaction rate can be too slow to be economically feasible. An operable temperature range is between from about $-40°$ C to about 120° C with about $-20°$ C to about 100° C a preferred range while about 0° C to about 80° C a more preferred range. At the lower temperature a solvent can be used to keep various components in solution. Many different solvents can be used, for example methylene chloride is one having the advantage of a low cost. The operating pressure can vary substantially, however, it can range from about atmospheric up to about 2000 psi with about 100 psi a preferred upper value. Process economics favor lower operating pressure, however, a moderately elevated reaction pressure may be desirable.

To further illustrate the invention, the following examples are provided.

EXAMPLES

About 10 mg. of $NiCl_2(TBP)_2$ were added to a suitable sealed container followed by 1 ml. of NBD. The resulting mixture, having a burgundy color, was heated to 90° C to insure solution and then after 5 min. at that temperature cooled to 0° C. After cooling, 0.2 ml. of DEAC solution (1 molar in toluene) was slowly added to the container. Upon the addition of the DEAC the temperature of the mixture rose to 92° C and after 8 minutes a solid polymer formed. The NBD conversion to polymer was very substantial if not complete. The polymer, after one precipitation from methanol, was tested as to melting point. At a temperature in excess of 300° C the solid started to decompose, i.e. fumes evolved.

In another run 0.00036g. ($5 \times 10-4$ mm(millimoles) of purplish-red $NiCl_2(TCHP)_2$ were placed in a suitable container and then 0.01 ml. of NBD were added. The temperature of the components during the addition was 20° C but then the temperature was lowered to $-10°$ C. At the lower temperature 0.01 ml. of DEAC solution (1 molar in toluene) were added and the temperature of the resulting mixture rose to 0° C upon which heating was begun. At 92° C heating was stopped and the amber colored liquid was allowed to cool to 20° C. On standing the mixture became a solid polymer.

In another run 0.034 grams of $NiCl_2$ $(TPP)_2$ were added to a suitable container along with 1.0 ml. of NBD. The black crystals of $NiCl_2(TPP)_2$ were only slightly soluble in the NBD at 20° C. The container and its contents were heated to 50° C but the insolubles did not disappear. After the heating the temperature of the contents was lowered to $-70°$ C and 0.5 ml. of DEAC solution (1 molar in toluene) were added. The mixture was allowed to warm to room temperature. Then the mixture was slowly heated to 92° C and kept at that temperature for 11 minutes and then allowed to cool to room temperature. The clear amber liquid thickened and became a solid polymer. The resulting polymer did not readily dissolve in cold toluene.

In another run, 30 mm of NBD, 0.06 mm of $NiCl_2(TPP)_2$, 0.6 mm of DEAC and 0.4 ml. of solvent were mixed in a suitable container. A gradual exotherm developed upon addition of the DEAC; the temperature of the resulting mixture rose to 85° C within 10 minutes. The exotherm was controlled by cooling the container. The resulting product was a viscous solution, orange colored. The viscous solution was triturated in methanol-acetone and as a result a white solid dropped. The solid was filtered. The solid was largely soluble in toluene with only a small amount remaining undissolved.

When similar runs were conducted using DEAC and one of the following $[(NiCl_2Br(TPP)]^- $ $^{[iPTPP]+}$ or $Ni(CO)_2(TPP)_2$ or $NiBr_2(TPP)_2$, or $NiA_2$ or $NiA_2 DIPHOS$, a solid polymer was obtained. Also if EADC or EASC is used in lieu of DEAC analogous results will be obtained. Use of other halides, i.e. fluoride, and bromide, in lieu of chloride, will give similar results.

The invention claimed is:

1. Process for preparing solid polymer of norbornadiene comprising:
  (a) contacting norbornadiene in the presence of a catalytic amount of a homogeneous catalytic system of nickel acetylacetonate or a nickel-phosphine complex selected from the group consisting of nickel dihalide bis(tributylphosphine); nickel dihalide bis(tricyclohexylphosphine); nickel dihalide bis(triphenylphosphine); isopropyl triphenyl phosphonium nickel dihalide bromide triphenylphosphine; nickel dicarbonyl bis(triphenylphosphine); nickel dibromide bis(trisphenylphosphine); nickel acetylacetonate hydrate-1,2 bisdiphenylphosphino ethane and wherein the halide is selected from the group consisting of fluoride, chloride and bromide; and an alkyl aluminum chloride selected from the group consisting of diethyl aluminum chloride, ethyl aluminum dichloride and ethyl aluminum sesquichloride;

(b) having the contacting occurring at a temperature within the range between from about −40° C to about 120° C; and (c) continuing the contacting until the solid polymer of norbornadiene is prepared.

2. Process according to claim 1 wherein the temperature is within the range between from about −20° C to about 100° C.

3. Process according to claim 1 wherein a solvent is present.

4. Process according to claim 3 wherein the temperature is within the range between from about −20° C to about 100° C.

5. Process according to claim 1 wherein the norbornadiene to nickel acetylacetonate or nickel phosphine complex mole ratio is between from about 10 to about 2000.

6. Process according to claim 1 wherein the alkyl aluminum chloride to nickel acetylacetonate or nickel phosphine complex mole ratio is between from about 0.5 to about 100.

7. Process according to claim 6 wherein a solvent is present.

8. Process according to claim 7 wherein the solvent is selected from group consisting of aromatic hydrocarbons, cycloparaffins, ethers, halogenated aromatics, halogenated paraffins and halogenated cycloparaffins.

9. Process according to claim 8 wherein the norbornadiene to nickel acetylacetonate or nickel phosphine complex mole ratio is between from about 10 to about 2000.

10. Process according to claim 9 wherein the alkyl aluminum chloride to nickel acetylacetonate or nickel phosphine complex mole ratio is between from about 0.5 to about 100.

11. Process according to claim 10 wherein the temperature is in the range between from about 0° C to about 80° C.

* * * * *